US012311667B2

(12) United States Patent
Takeuchi et al.

(10) Patent No.: US 12,311,667 B2
(45) Date of Patent: May 27, 2025

(54) LIQUID EJECTION HEAD AND METHOD FOR MANUFACTURING THE SAME

(71) Applicant: CANON KABUSHIKI KAISHA, Tokyo (JP)

(72) Inventors: Souta Takeuchi, Kanagawa (JP); Masaya Uyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 17/872,999

(22) Filed: Jul. 25, 2022

(65) Prior Publication Data

US 2023/0030043 A1 Feb. 2, 2023

(30) Foreign Application Priority Data

Jul. 30, 2021 (JP) ................................ 2021-125351

(51) Int. Cl.
*B41J 2/14* (2006.01)
*B41J 2/16* (2006.01)

(52) U.S. Cl.
CPC ............ *B41J 2/1433* (2013.01); *B41J 2/162* (2013.01); *B41J 2/1642* (2013.01)

(58) Field of Classification Search
CPC ........ B41J 2/1433; B41J 2/162; B41J 2/1642; B41J 2/14145; B41J 2/1603; B41J 2/1628; B41J 2/1629; B41J 2/1632; B41J 2/1606
See application file for complete search history.

(56) References Cited

U.S. PATENT DOCUMENTS

2019/0077147 A1* 3/2019 Yazaki .................. B41J 2/1628

FOREIGN PATENT DOCUMENTS

EP 3248784 A1 * 11/2017 .............. B32B 9/00
JP 2017213860 A 12/2017
JP 2018103382 A 7/2018

OTHER PUBLICATIONS

Terasaki Atsunori et al., "Liquid Ejection Head, Method for Manufacturing the Same, and Printing Method" (EP 3248784 A1), Nov. 2, 20179, [Abstract, Paragraphs 0023, 0029] (Year: 2017).*

* cited by examiner

*Primary Examiner* — Lisa Solomon
(74) *Attorney, Agent, or Firm* — Canon U.S.A., Inc. IP Division

(57) ABSTRACT

A highly reliable liquid ejection head comprises a substrate made of silicon and having a first surface and a second surface opposite to the first surface, an ejection port forming member bonded to the first surface of the substrate and formed with an ejection port for ejecting liquid, and a bonded member configured to be bonded to the second surface of the substrate. A through flow path is formed in the substrate, which is configured to pass through the substrate and to supply liquid to the ejection port. A first protective film made of a metal oxide is formed on an inner surface of the through flow path, and a second protective film made of a silicon compound is formed on all of the second surface of the substrate.

14 Claims, 5 Drawing Sheets

LIQUID EJECTION HEAD AND METHOD FOR MANUFACTURING THE SAME

BACKGROUND OF THE INVENTION

Field of the Invention

The present disclosure relates to a liquid ejection head and a method for manufacturing the liquid ejection head

Description of the Related Art

In some liquid ejection heads used in inkjet print apparatuses or the like, a protective film containing a metal oxide is provided at a portion of a silicon substrate (such as an inner surface of a through hole serving as a liquid flow path) in contact with a liquid in order to suppress dissolution (corrosion) of the silicon substrate by the liquid such as ink. However, before forming the protective film on the silicon substrate, a residue (organic residue) such as a resist used for forming a through hole may reattach to the silicon substrate and cause organic contamination, and if a surface condition of the silicon substrate changes, an adhesion of the formed protective film may be lowered. As a result, a peeling phenomenon such as swelling or floating occurs in the protective film, and the silicon substrate may be dissolved starting from this point. On the other hand, Japanese Patent Application Laid-Open No. 2018-103382 discloses a method in which the protective film formed on a rear surface of the substrate is removed by etching, and then a new protective film is formed on the removed portion. According to this method, the organic residue adhering to the rear surface of the substrate is also removed together with the protective film, and the rear surface of the substrate is cleaned, whereby the adhesion between the substrate and the protective film can be enhanced.

However, in the method disclosed in Japanese Patent Application Laid-Open No. 2018-103382, since the protective film is etched after a port of a liquid flow path opening on the rear surface of the substrate is closed with the dry film resist, the protective film around the opening, covered with the resist cannot be removed. Therefore, organic contamination remains in this region, and a peeling phenomenon of the protective film may occur, which may prevent sufficient bonding strength with a member bonded to the rear surface of the substrate.

SUMMARY OF THE INVENTION

It is therefore an aspect of the present disclosure to provide a highly reliable liquid ejection head and a method for manufacturing the same by suppressing the dissolution of the substrate and sufficiently ensuring the bonding strength between the substrate and a member to be bonded to the substrate.

A liquid ejection head according to the present disclosure comprises: a substrate made of silicon and having a first surface and a second surface opposite to the first surface; an ejection port forming member bonded to the first surface of the substrate and formed with an ejection port for ejecting a liquid; and a bonded member configured to be bonded to the second surface of the substrate, wherein a through flow path is formed in the substrate, which is configured to pass through the substrate and to supply the liquid to the ejection port, and a first protective film made of a metal oxide is formed on an inner surface of the through flow path. In one aspect of the present disclosure, a second protective film made of a silicon compound is formed on all of the second surface of the substrate. In other aspect of the present disclosure, the first protective film has an end surface on the same plane as the second surface of the substrate.

A method according to the present disclosure, for manufacturing a liquid ejection head which comprises: a substrate made of silicon and having a first surface and a second surface opposite to the first surface; an ejection port forming member bonded to the first surface of the substrate and formed with an ejection port for ejecting a liquid; and a bonded member configured to be bonded to the second surface of the substrate, wherein a through flow path is formed in the substrate, which is configured to pass through the substrate and to supply the liquid to the ejection port, and a first protective film made of a metal oxide is formed on an inner surface of the through flow path, the method comprising the steps of: forming the first protective film on at least the second surface of the substrate; thinning the substrate from a side of the second surface after forming the first protective film, and removing the first protective film formed on the second surface to expose all of the second surface; and forming a second protective film made of a silicon compound on all of the exposed second surface.

Further features of the present disclosure will become apparent from the following description of exemplary embodiments with reference to the attached drawings.

DESCRIPTION OF THE EMBODIMENTS

Embodiments of the present disclosure will now be described with reference to the drawings.

First Embodiment

Figure 1A:
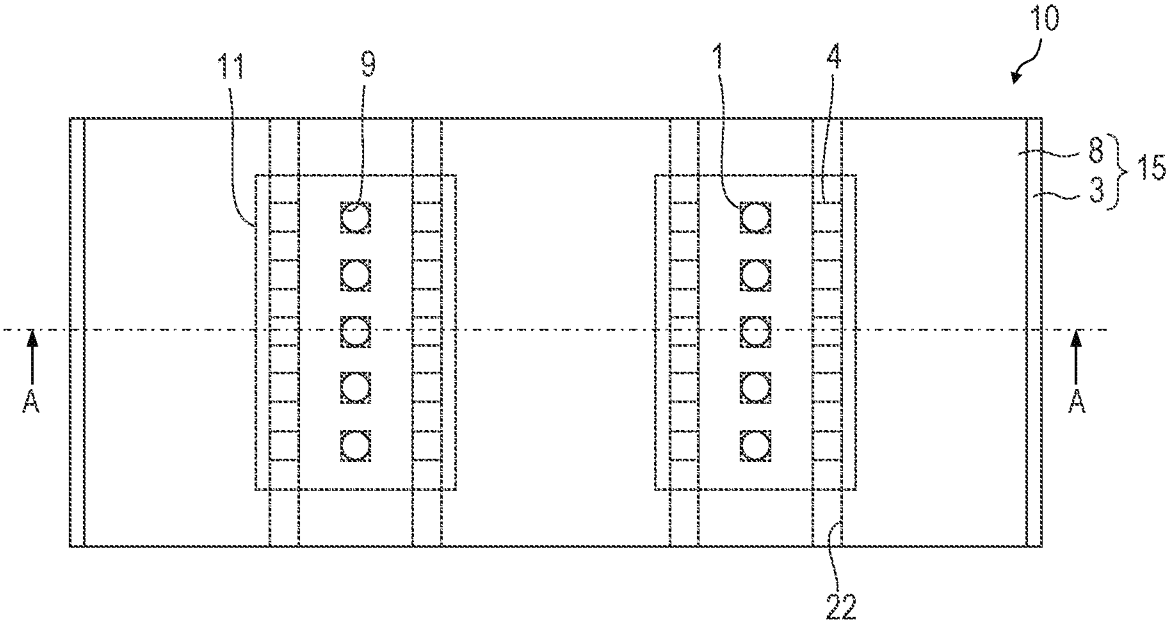
FIG. 1A is a plan view of a liquid ejection head according to a first embodiment.
Figure 1B:
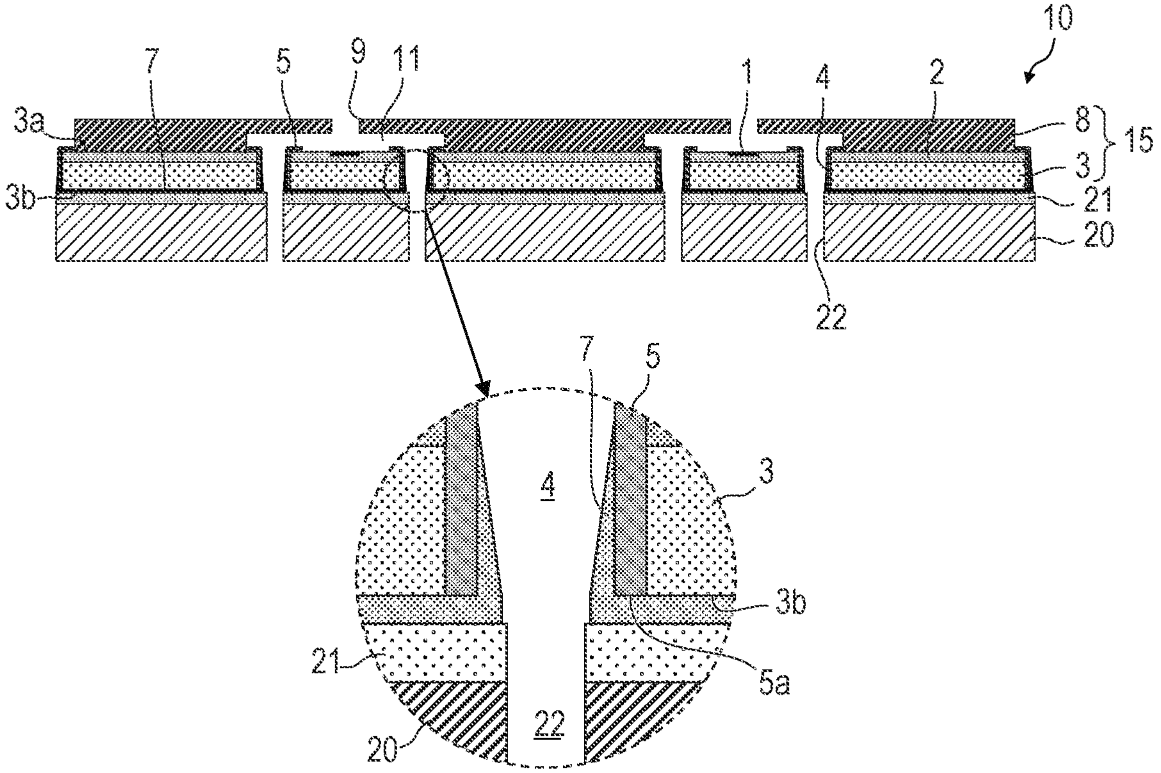
FIG. 1B is a sectional view of the liquid ejection head according to the first embodiment.

FIG. 1A is a plan view of a liquid ejection head according to a first embodiment of the present disclosure, and shows a side where ejection ports for ejecting liquid are formed. FIG. 1B is a sectional view taken along line A-A of FIG. 1A.

The liquid ejection head 10 ejects a liquid such as ink to print an image on a print medium, and has a print element substrate 15 having a substrate 3 and an ejection port forming member 8. The print element substrate 15 is bonded to a support member 20 with a resin adhesive 21.

The substrate 3 made of silicon has a front surface (hereinafter also referred to as "substrate front surface") 3_a_ and a rear surface (hereinafter also referred to as "substrate rear surface") 3_b_ on the opposite side thereof, and the ejection port forming member 8 made of a photosensitive epoxy resin is bonded to the substrate front surface 3_a_. A plurality of ejection ports 9 for ejecting liquid and a pressure chamber 11 communicating with the plurality of ejection ports 9 are formed in the ejection port forming member 8. The substrate 3 is formed with a plurality of individual flow paths (through flow paths) 4 for passing through the substrate 3, communicating with the pressure chamber 11, and supplying liquid to the ejection port 9. On the substrate front surface 3*a*, an energy generating element (heater) 1 for generating energy used for ejecting liquid is provided at a position facing the ejection port 9. The liquid in the pressure chamber 11 can be foamed and ejected from the ejection port 9 by the energy generated by the energy generating element 1. An interlayer insulating film 2 including a driving circuit made of a semiconductor element for driving the energy generating element 1 and a wire layer is also formed on the substrate front surface 3*a* by a multilayer wiring technique using photolithography. The support member 20 is formed with a common flow path 22 which passes through the support member 20 and communicates with the plurality of individual flow paths 4.

A first protective film 5 made of metal oxide for suppressing the dissolution of the substrate 3 by a liquid such as ink is formed on the inner surface of the individual flow path 4. The dissolution of silicon often occurs when an alkaline ink is used as the liquid. Therefore, as a specific material of the first protective film 5, it is preferable that the first protective film 5 has high corrosion resistance to an alkali solution, for example, an oxide of Ti, Zr, Hf, V, Nb, or Ta is presented, and TiO (titanium oxide) is particularly preferable. The first protective film 5 is not provided up to the substrate rear surface 3*b*, but has an end surface 5*a* on the same plane as the substrate rear surface 3*b*, and the end surface 5*a* is a surface formed by polishing in a manufacturing process of the liquid ejection head 10 described later.

A second protective film 7 made of a silicon compound for suppressing the dissolution of the substrate 3 by a liquid such as ink is formed on the substrate rear surface 3*b* of the substrate. The second protective film 7 is formed to the inside of the individual flow path 4 so as to cover the end surface 5*a* of the first protective film 5 on the substrate rear surface 3*b* side. Thus, as described above, it is possible to suppress the deterioration of the reliability of the first protective film 5 due to the progress of corrosion from the end surface 5*a* on the side of the substrate rear surface 3*b*, which is the polishing surface. Since the second protective film 7 is formed on the bonding surface (substrate rear surface 3*b*) of the substrate 3 bonded with the support member 20, it is preferable that the second protective film 7 has excellent adhesion to the substrate 3, and in addition, it is preferable that the second protective film 7 itself has liquid resistance such as ink resistance. For this reason, as a specific material of the second protective film 7, it is preferable to use a silicon compound containing carbon such as SiC, SiOC, SiCN, SiOCN, and the like, and particularly the use of SiC (silicon carbide) is preferable.

Referring now to FIGS. 2A to 2H, a method of manufacturing a liquid ejection head according to the present embodiment will be described.

FIGS. 2A to 2H are cross sectional views of the liquid ejection head in each step of the manufacturing method of the present embodiment, and are views corresponding to FIG. 1B. The order of the steps described below is only an example, and the order of the steps may be changed as necessary.

Figure 2A:
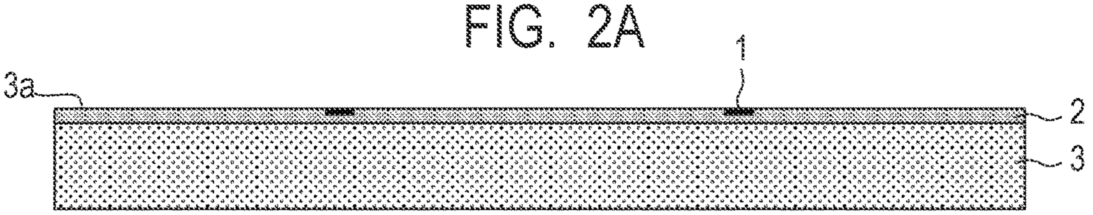
FIGS. 2A, 2B, 2C, 2D, 2E, 2F, 2G and 2H are sectional views showing a method of manufacturing a liquid ejection head according to the first embodiment.
Figure 2B:
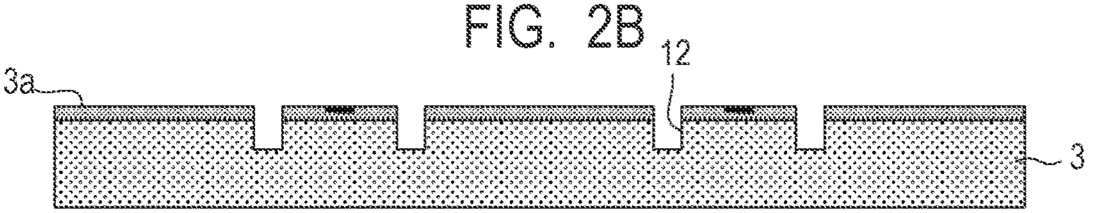

First, as shown in FIG. 2A, a substrate 3 having the energy generating element 1 and the interlayer insulating film 2 on a substrate front surface 3*a* is prepared. As shown in FIG. 2B, etching is performed from the substrate front surface 3*a* side to form a plurality of recesses 12 on the substrate front surface 3*a*. As the etching method of the substrate 3, for example, a dry etching method by deep reactive ion etching (Deep-RIE) in which etching and film formation are alternately performed can be cited.

Figure 2C:
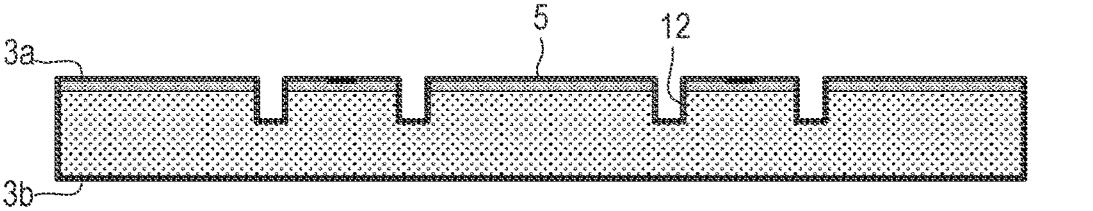

Next, as shown in FIG. 2C, a first protective film 5 made of a metal oxide is formed on the substrate front surface 3*a*, the substrate rear surface 3*b*, and the inner surface of the recess 12. As the method for forming the first protective film 5, for example, a chemical vapor deposition method (CVD), a sputtering method, an atomic layer deposition method (ALD), or the like can be used, and among them, an ALD method having excellent coating properties for steps and holes is preferable. Thus, the first protective film 5 can be formed on the substrate front surface 3*a*, the substrate rear surface 3*b*, and the inner surface of the recess 12 with substantially uniform thickness.

Figure 2D:
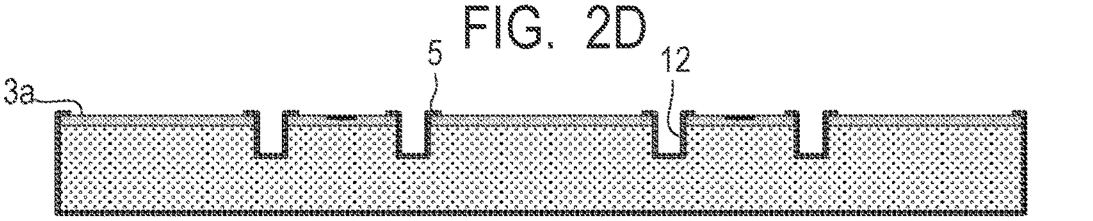

Next, as shown in FIG. 2D, the first protective film 5 on the substrate front surface 3*a* is patterned to remove an unnecessary portion of the first protective film 5, that is, a portion of the first protective film 5 corresponding to a region where the ejection port forming member 8 is bonded and a region where the pressure chamber 11 is formed. For patterning, a tenting method in which etching is performed after an opening of the recess 12 is closed with a dry film resist is used, and as an etching method, for example, wet etching with buffered hydrofluoric acid (BHF) is used.

Figure 2E:
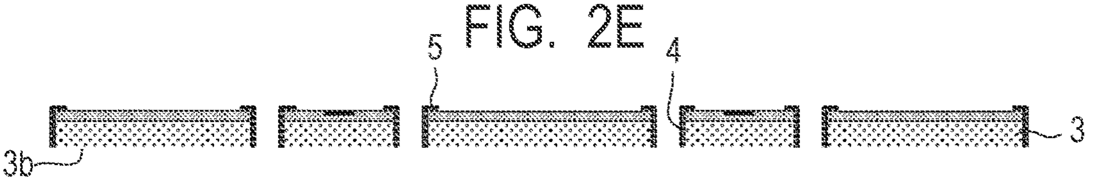

Next, as shown in FIG. 2E, the substrate 3 is thinned from the substrate rear surface 3*b* side, all of the first protective films 5 formed on the substrate rear surface 3*b* is removed, and the recesses 12 are opened on the substrate rear surface 3*b* to form individual flow paths 4 formed of through holes. Thus, the entire surface of the substrate rear surface 3*b* is exposed, and the end surface 5*a* of the first protective film 5 on the substrate rear surface 3*b* side is exposed. As a method for thinning the substrate 3, for example, polishing such as chemical mechanical polishing (CMP) can be mentioned.

Figure 2F:
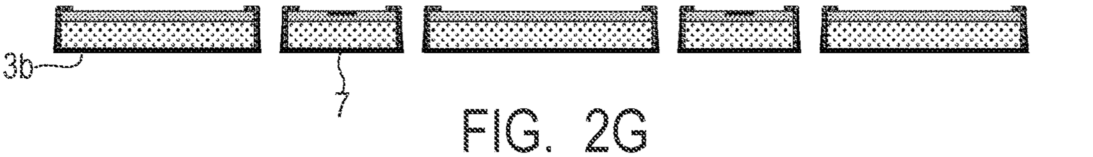

Next, as shown in FIG. 2F, a second protective film 7 made of a silicon compound is formed on the entire surface of the exposed substrate rear surface 3*b*. As the method for forming the second protective film 7, a general film forming method such as a CVD method or a sputtering method can be used, but a plasma CVD method is preferably used in consideration of the coverage property. As a result, the end surface 5*a* of the first protective film 5 on the side of the substrate rear surface 3*b* can be surely covered with the second protective film 7, and the progress of corrosion from the end surface 5*a* which is the polishing surface can be suppressed as described above.

Figure 2G:
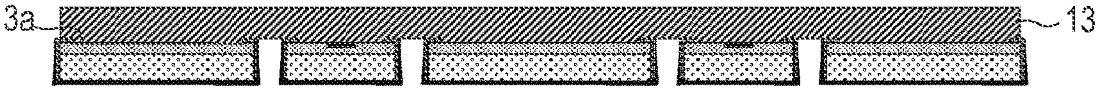
Figure 2H:
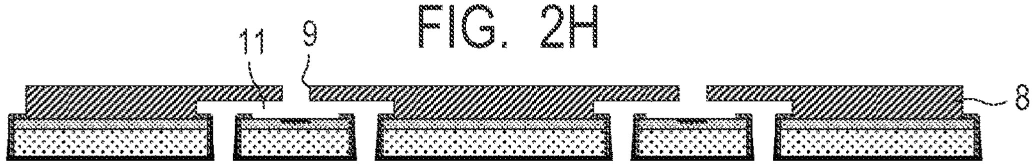

Next, as shown in FIG. 2G, a dry film 13 containing a photosensitive epoxy resin is stuck to the substrate front surface 3*a*. As shown in FIG. 2H, the dry film 13 is partially exposed and developed to remove unnecessary portions, thereby forming the ejection port forming member 8 having the ejection port 9 and the pressure chamber 11. Thereafter, a support member 20 having a common flow path 22 formed of a through groove is prepared, and the print element substrate 15 including the ejection port forming member 8 and the substrate 3 and the support member 20 are bonded by using a resin adhesive 21 to complete the liquid ejection head 10 shown in FIG. 1B. As a method for forming the common flow path 22 in the support member 20, anisotropic etching by wet etching, a laser method, or a sandblasting method can be used. A plasma activated bonding using an oxide film may be used for bonding the print element substrate 15 with the support member 20.

According to the present embodiment, even if the substrate rear surface 3*b* is contaminated with organic residues before the first protective film 5 is formed, the organic residues can be removed from the substrate rear surface 3*b* together with the first protective film 5 by thinning the substrate 3 from the substrate rear surface 3*b* side after the first protective film 5 is formed. By forming the second protective film 7 on the entire surface of the substrate rear surface 3*b* thus cleaned, the adhesion between the substrate 3 and the second protective film 7 can be enhanced. Further, since the support member 20 is bonded to the entire surface of the substrate rear surface 3*b* through the second protective film 7 formed with good adhesion, the bonding strength between the substrate 3 and the support member 20 can also be secured. It should be noted that, due to the thinning (polishing) of the substrate 3, there is a concern that corrosion progresses from the end surface 5*a* exposed on the substrate rear surface 3*b*, thereby reducing the reliability of the first protective film 5, but there is no such concern because the end surface 5*a* of the first protective film 5 is covered by the second protective film 7. That is, since the inner surface of the individual flow path 4 is covered with the first protective film 5, and the substrate rear surface 3*b* and the end surface 5*a* of the first protective film 5 on the side of the substrate rear surface 3*b* are covered with the second protective film 7, the dissolution of the substrate 3 by the liquid such as ink can be suppressed.

Second Embodiment

Figure 3A:
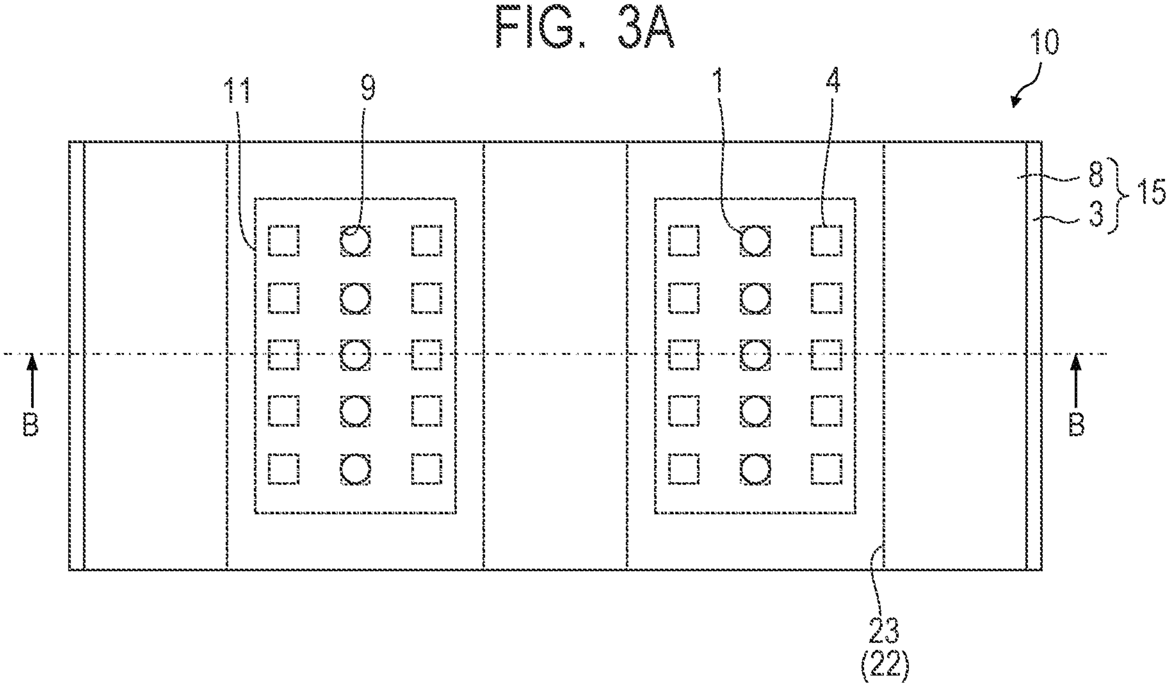
FIG. 3A is a plan view of a liquid ejection head according to a second embodiment.
Figure 3B:
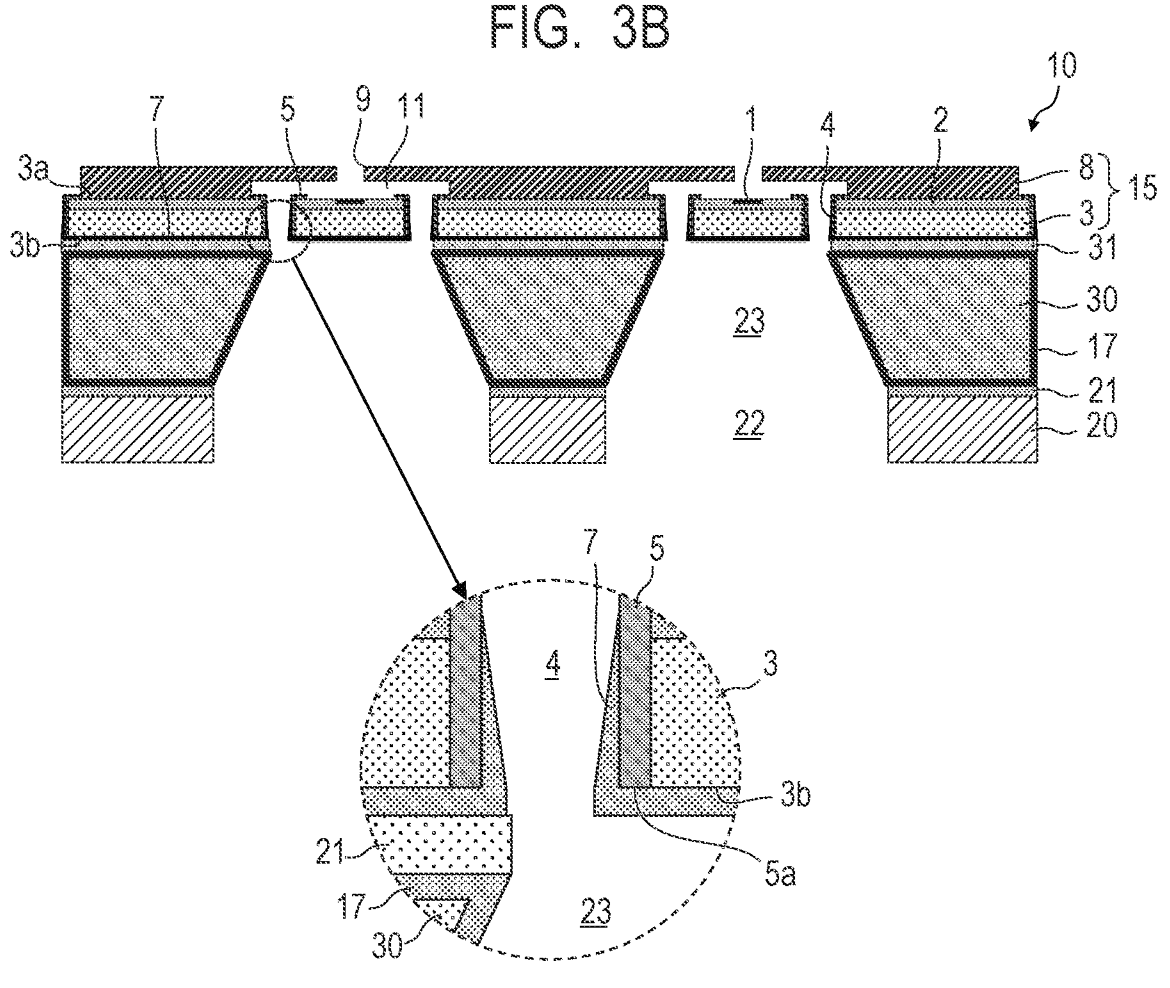
FIG. 3B is a sectional view of the liquid ejection head according to the second embodiment

FIG. 3A is a plan view of a liquid ejection head according to a second embodiment of the present disclosure, and shows a surface on which an ejection port for ejecting the liquid is formed. FIG. 3B is a sectional view taken along line B-B of FIG. 3A. Hereinafter, the same components as those of the first embodiment are denoted by the same reference numerals in the drawings and the description thereof is omitted, and only the components different from those of the first embodiment will be described.

The present embodiment differs from the first embodiment in that the flow path substrate 30 is incorporated between the print element substrate 15 and the support member 20 (accordingly, the shape of the common flow path 22 is changed). The flow path substrate 30 is formed with a connection flow path 23 that communicates with the common flow path 22 and the plurality of individual flow paths 4 and smooths the flow of the liquid from the common flow path 22 to the plurality of individual flow paths 4. The flow path substrate 30 is made of silicon, and as a method of forming the connection flow path 23, for example, anisotropic etching by wet etching can be used. A third protective film 17 made of a silicon compound for suppressing the dissolution of the flow path substrate 30 by the liquid such as ink is formed on both the front and rear surfaces of the flow path substrate 30 (the surface facing the substrate 3 and the surface on the opposite side thereof) and the inner surface of the connection flow path 23. As a specific material of the third protective film 17, like the second protective film 7, it is preferable to use, for example, a silicon compound containing carbon such as SiC, SiOC, SiCN, or SiOCN, and it is particularly preferable to use SiC. As the method for forming the third protective film 17, a general film forming method such as a CVD method or a sputtering method can be used, but a plasma CVD method is preferably used in consideration of the coverage property.

As described above, in the present embodiment, the bonded member to be bonded to the substrate rear surface 3*b* is different from that in the first embodiment, but the obtained effect is the same as that in the first embodiment. Although the flow path substrate 30 is bonded to the print element substrate 15 by the resin adhesive 31 and to the support member 20 by the resin adhesive 21, plasma activation bonding using an oxide film may be used for at least any of the bonding.

Third Embodiment

Figure 4A:
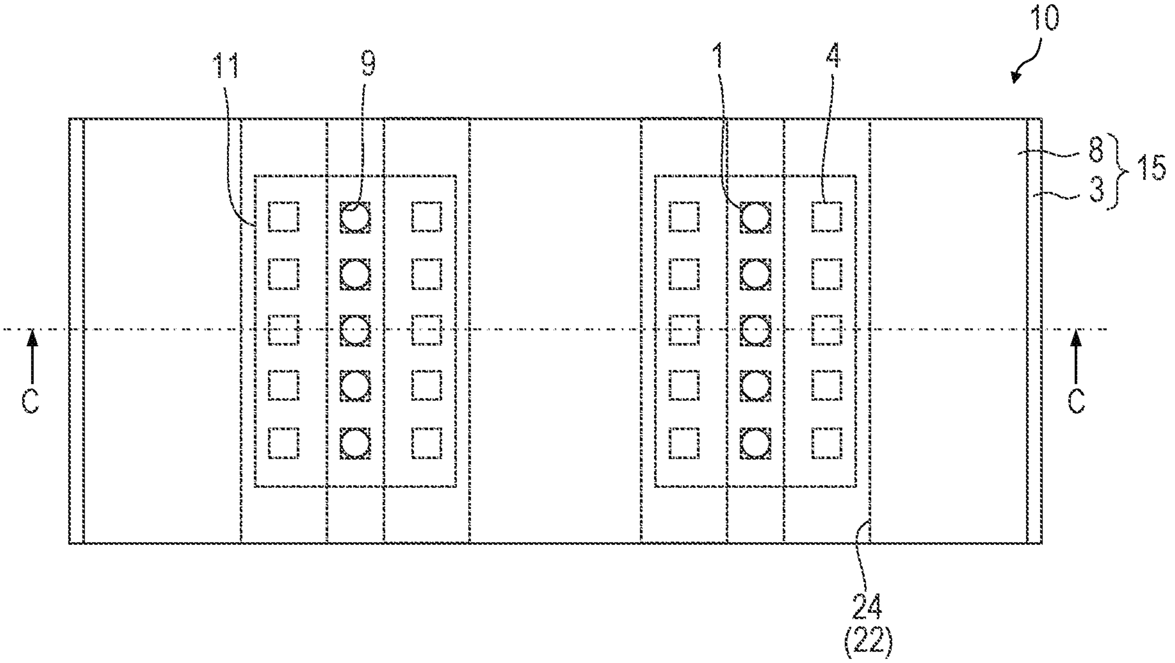
FIG. 4A is a plan view of a liquid ejection head according to a third embodiment.
Figure 4B:
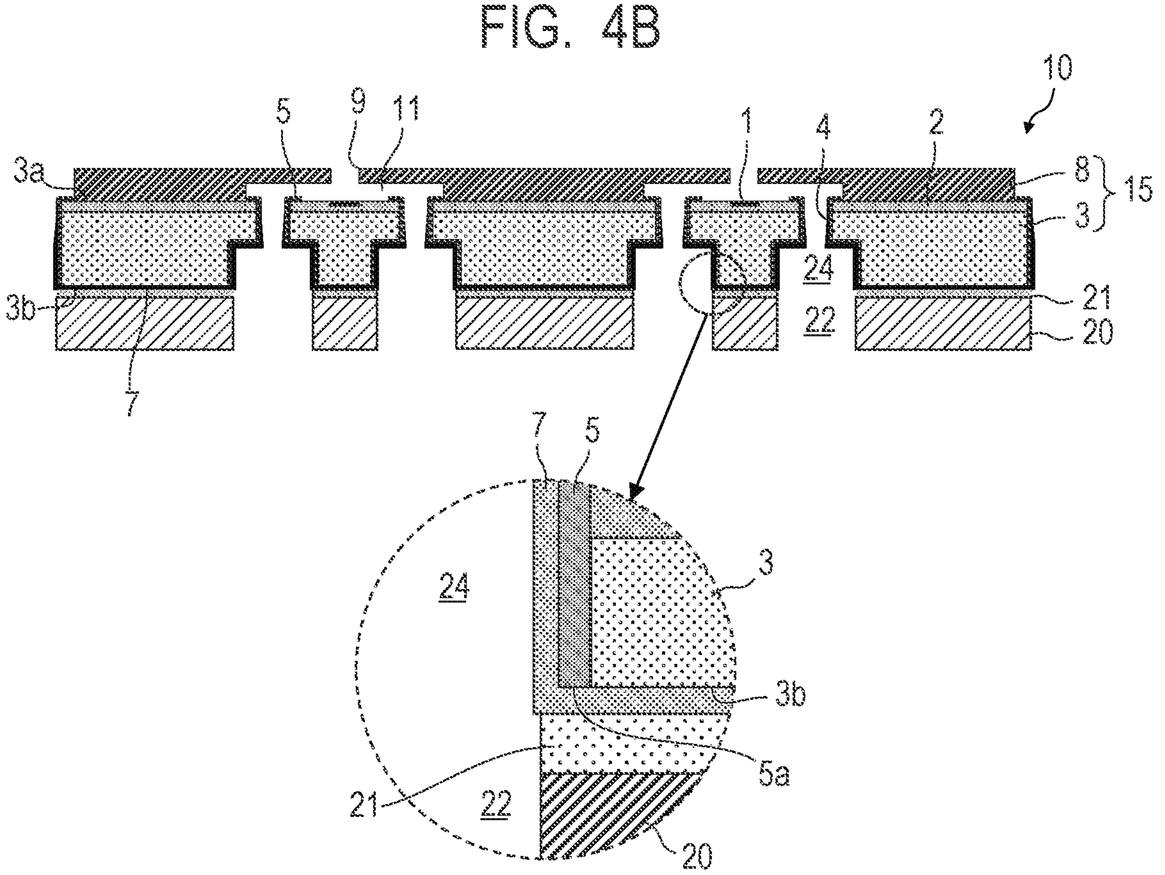
FIG. 4B is a sectional view of the liquid ejection head according to the third embodiment

FIG. 4A is a plan view of a liquid ejection head according to a third embodiment of the present disclosure, and shows a side where ejection ports for ejecting liquid are formed. FIG. 4B is a sectional view taken along the line C-C of FIG. 4A. Hereinafter, the same reference numerals as those of the above described embodiment are attached to the drawings, and the description thereof will be omitted, and only the configuration different from the above described embodiment will be described.

The present embodiment differs from the first embodiment in that the flow path structure formed on the substrate 3 is changed (accordingly, the shape of the common flow path 22 is changed). In other words, the substrate 3 is formed with through flow paths 4 and 24 comprising a plurality of individual flow paths 4 opening to the substrate front surface 3*a* and a common flow path 24 opening to the substrate rear surface 3*b* and communicating with the plurality of individual flow paths 4. Therefore, in the present embodiment, the manufacturing method of the liquid ejection head 10 is different from that in the first embodiment as described below, and the area of the bonding surface (the substrate rear surface 3*b*) of the substrate 3 bonding with the support member 20 is smaller than that in the first embodiment, but the obtained effect is the same as that in the first embodiment.

Referring now to FIGS. 5A to 5H, a method of manufacturing the liquid ejection head of the present embodiment will be described.

FIGS. 5A to 5H are cross sectional views of the liquid ejection head in each step of the manufacturing method of the present embodiment, and are views corresponding to FIG. 4B. The order of the steps described below is only an example, and the order of the steps may be changed as necessary.

Figure 5A:
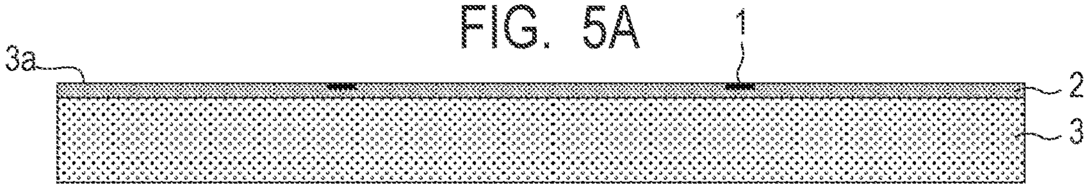
FIGS. 5A, 5B, 5C, 5D, 5E, 5F, 5G and 5H are sectional views showing a method of manufacturing a liquid ejection head according to the third embodiment.
Figure 5B:
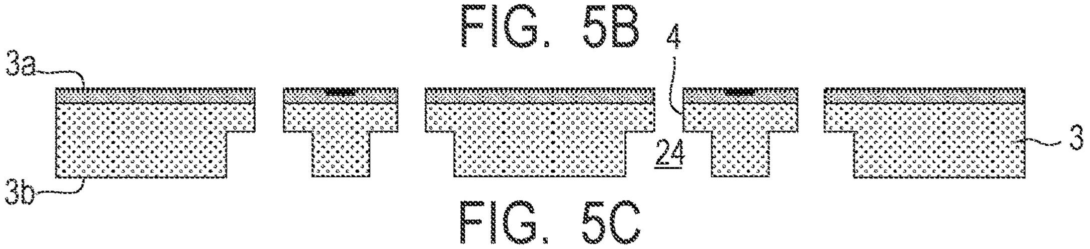

First, as shown in FIG. 5A, a substrate 3 having an energy generating element 1 and an interlayer insulating film 2 on a substrate front surface 3*a* is prepared. Then, as shown in FIG. 5B, etching is performed from the substrate front surface 3*a* side and the substrate rear surface 3*b* side, respectively, to form through flow paths 4 and 24 comprising a plurality of individual flow paths 4 opening to the substrate front surface 3*a* and a common flow path 24 opening to the substrate rear surface 3*b*. As the etching method of the substrate 3, for example, a dry etching method by Deep-RIE in which etching and film formation are alternately performed can be cited.

Figure 5C:
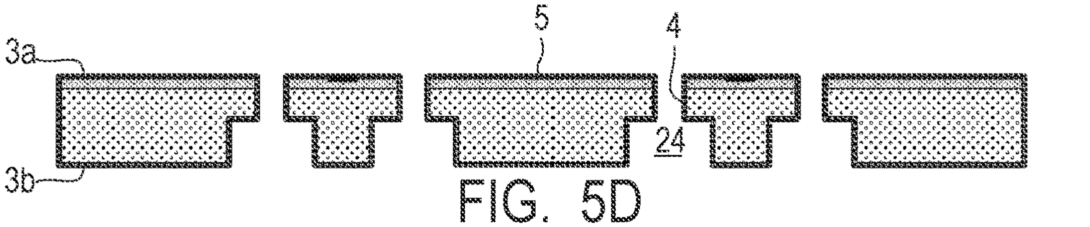

Next, as shown in FIG. 5C, a first protective film 5 made of a metal oxide is formed on the substrate front surface 3*a* and the substrate rear surface 3*b*, and on the inner surfaces of the through flow paths 4 and 24. As the method for forming the first protective film 5, for example, a CVD method, a sputtering method, an ALD method, or the like can be used, and among them, an ALD method having excellent coating properties for steps and holes is preferably used. As a result, the first protective film 5 can be formed on the substrate front surface 3*a*, the substrate rear surface 3*b*, and the inner surfaces of the through flow paths 4 and 24 with substantially uniform thickness.

Figure 5D:
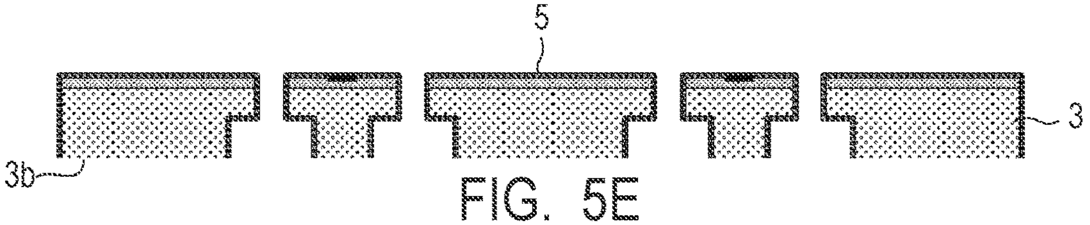

Next, as shown in FIG. 5D, the substrate 3 is thinned from the substrate rear surface 3*b* side, and all of the first protective films 5 formed on the substrate rear surface 3*b* are removed. Thus, the entire surface of the substrate rear surface 3*b* is exposed, and the end surface 5*a* of the first protective film 5 on the substrate rear surface 3*b* side is exposed. As a method for thinning the substrate 3, for example, polishing such as CMP can be mentioned.

Figure 5E:
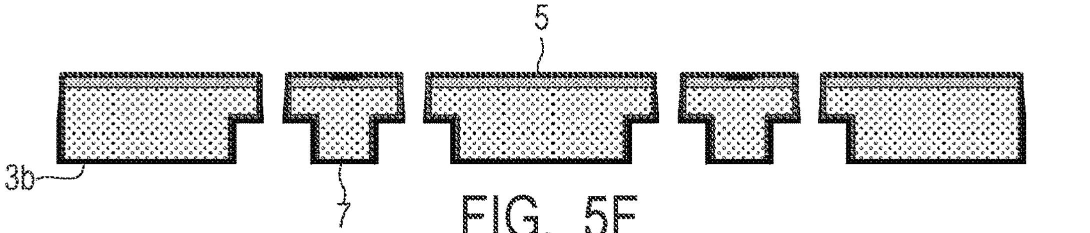

Next, as shown in FIG. 5E, a second protective film 7 made of a silicon compound is formed on the entire surface of the exposed substrate rear surface 3*b*. As the method for forming the second protective film 7, a general film forming method such as a CVD method or a sputtering method can be used, but a plasma CVD method is preferably used in consideration of the coverage property. As a result, the end surface 5*a* of the first protective film 5 on the side of the substrate rear surface 3*b* can be surely covered with the second protective film 7, and the progress of corrosion from the end surface 5*a* which is the polishing surface can be suppressed as described above.

Figure 5F:
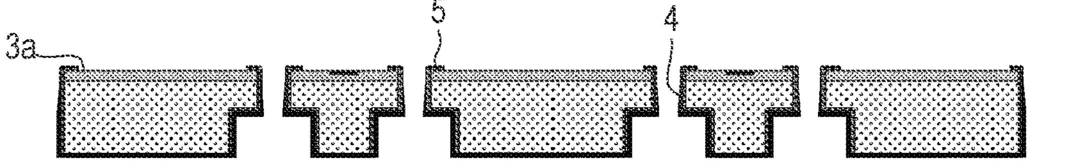

Next, as shown in FIG. 5F, the first protective film 5 on the substrate front surface 3*a* is patterned to remove an unnecessary portion of the first protective film 5. That is, a portion of the first protective film 5 corresponding to a region where the ejection port forming member 8 is bonded and a region where the pressure chamber 11 is formed. For patterning, a tenting method is used in which etching is performed after the openings of the individual flow paths 4 are closed with dry film resist, and wet etching by BHF, for example, is used as the etching method.

Figure 5G:
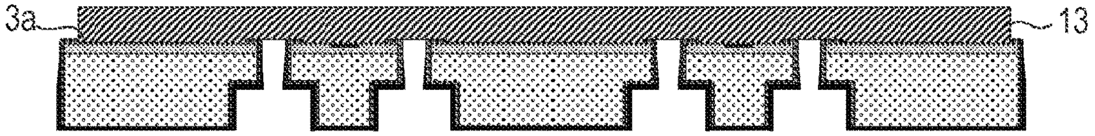
Figure 5H:
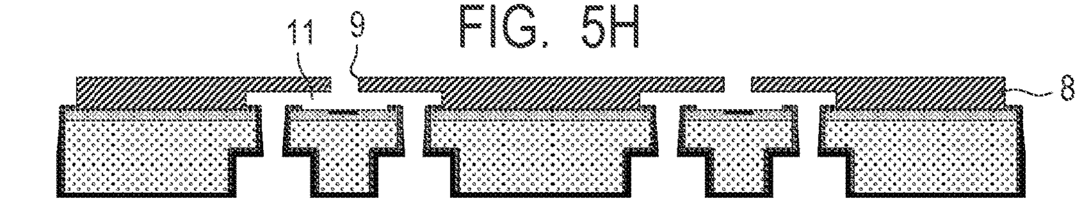

Next, as shown in FIG. 5G, a dry film 13 containing a photosensitive epoxy resin is stuck to the substrate front surface 3*a*. As shown in FIG. 5H, the dry film 13 is partially exposed and developed to remove unnecessary portions, thereby forming the ejection port forming member 8 having the ejection port 9 and the pressure chamber 11. Thereafter, the support member 20 having the common flow path 22 formed of the through groove is prepared, and the print element substrate 15 including the ejection port forming member 8 and the substrate 3 and the support member 20 are bonded with the resin adhesive 21 to complete the liquid ejection head 10 shown in FIG. 4B.

The present disclosure will now be described in more detail with reference to specific examples.

Specific First Example

In the present example, the liquid ejection head 10 shown in FIGS. 1A and 1B was manufactured by the manufacturing method shown in FIGS. 2A to 2H. As the substrate 3, a silicon substrate having a thickness of 700 μm and having an interlayer insulating film 2 having a thickness of 5 μm was prepared, and a prismatic recess having a size of 50 μm×50 μm and a depth of 250 μm was formed as the recess 12 by Deep-RIE using $SF_6$ and $C_4F_8$ as etching gases. A titanium oxide film having a thickness of 85 nm was formed as the first protective film 5 by the ALD method, and wet etching by BHF was used for etching the first protective film 5. The substrate 3 was polished to a thickness of 200 μm, and a silicon carbide film having a thickness of 50 nm was formed as the second protective film 7 by plasma CVD.

When a storage immersion test in which the liquid ejection head 10 thus prepared was immersed in the ink for a certain period of time was performed, peeling or dissolution of the substrate 3 was not confirmed.

Specific Second Example

The liquid ejection head 10 shown in FIGS. 3A and 3B was manufactured by the same procedure as in the Specific First example except for the following points. That is, a flow path substrate 30 on which a connection flow path 23 is formed was prepared, the print element substrate 15 and the flow path substrate 30 were bonded with a resin adhesive 31, and the support member 20 and the flow path substrate 30 were bonded with a resin adhesive 21. As the connection flow path 23, a through groove was formed by anisotropic etching by wet etching, and as the third protective film 17, a silicon carbide film having a thickness of 50 nm was formed by plasma CVD.

When a storage immersion test in which the liquid ejection head 10 thus prepared was immersed in the ink for a certain period of time was performed, peeling or dissolution of the substrate 3 was not confirmed.

Specific Third Example

In the present example, the liquid ejection head 10 shown in FIGS. 4A and 4B was manufactured by the manufacturing method shown in FIGS. 5A to 5H. As the substrate 3, a silicon substrate having a thickness of 700 μm and having an interlayer insulating film 2 having a thickness of 10 μm was prepared. By Deep-RIE using SF6 and C4F8 as etching gases, a prismatic recess having a size of 50 μm×50 μm and a depth of 200 μm was formed as the individual flow path 4, and a groove having a width of 200 μm and a depth of 500 μm was formed as the common flow path 24. A titanium oxide film having a thickness of 85 nm was formed as the first protective film 5 by the ALD method, and the substrate 3 was polished to a thickness of 650 μm. A silicon carbide film having a thickness of 50 nm was formed as the second protective film 7 by a plasma CVD method, and wet etching by BHF was used for etching the first protective film 5.

When a storage immersion test in which the liquid ejection head 10 thus prepared was immersed in the ink for a certain period of time was performed, peeling or dissolution of the substrate 3 was not confirmed.

According to the present disclosure, it is possible to provide a highly reliable liquid ejection head and its manufacturing method by suppressing the dissolution of a substrate and sufficiently securing the bonding strength between the substrate and a member bonded to the substrate.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125351, filed Jul. 30, 2021, which is hereby incorporated by reference herein in its entirety.

What is claimed is:

1. A liquid ejection head comprising:

a substrate made of silicon and having a first surface and a second surface opposite to the first surface;

an ejection port forming member bonded to the first surface of the substrate and formed with an ejection port for ejecting a liquid; and a bonded member configured to be bonded to the second surface of the substrate, wherein a through flow path is formed in the substrate, which is configured to pass through the substrate and to supply the liquid to the ejection port, and a first protective film made of a metal oxide is formed on an inner surface of the through flow path, wherein a second protective film made of a silicon compound is formed on all of the second surface of the substrate, wherein the first protective film has an end surface coplanar with the second surface, and wherein the first protective film is not provided on the second surface.

2. The liquid ejection head according to claim 1, wherein the second protective film is formed to cover an end surface of the first protective film on a side of the second surface.

3. The liquid ejection head according to claim 1, wherein the silicon compound is silicon carbide.

4. The liquid ejection head according to claim 1, wherein the metal oxide is titanium oxide.

5. The liquid ejection head according to claim 1, wherein the bonded member is a flow path substrate having a connection flow path communicating with the through flow path.

6. A liquid ejection head comprising:

a substrate made of silicon and having a first surface and a second surface opposite to the first surface;

an ejection port forming member bonded to the first surface of the substrate and formed with an ejection port for ejecting a liquid; and a bonded member bonded to the second surface of the substrate, wherein a through flow path is formed in the substrate, which is configured to pass through the substrate and to supply the liquid to the ejection port, and a first protective film made of a metal oxide is formed on an inner surface of the through flow path, a second protective film made of a silicon compound is formed on the second surface of the substrate, the first protective film has an end surface coplanar with the second surface of the substrate, and wherein the first protective film is not provided on the second surface.

7. The liquid ejection head according to claim 6, wherein the second protective film is formed to cover the end surface of the first protective film.

8. The liquid ejection head according to claim 6, wherein the silicon compound is silicon carbide.

9. The liquid ejection head according to claim 6, wherein the metal oxide is titanium oxide.

10. The liquid ejection head according to claim 6, wherein the bonded member is a flow path substrate having a connection flow path communicating with the through flow path.

11. The liquid ejection head according to claim 10, wherein the flow path substrate is made of silicon, and a third protective film made of a silicon compound is formed on a surface of the flow path substrate facing the substrate and a surface on an opposite side the flow path substrate, and on the inner surface of the connection flow path.

12. The liquid ejection head according to claim 1, wherein the first protective film is not provided up to the second surface.

13. The liquid ejection head according to claim 1, wherein the bonded member is configured to be bonded to the entire second surface.

14. The liquid ejection head according to claim 1, wherein the second protective film contacts the second surface of the substrate.

* * * * *